(12) United States Patent
Yoon (10) Patent No.: US 9,760,741 B2
(45) Date of Patent: Sep. 12, 2017

(54) CARD READER

(71) Applicant: Korea Information & Communications Co., Ltd., Seoul (KR)

(72) Inventor: Sang-Jin Yoon, Seoul (KR)

(73) Assignee: Korea Information & Communications Co., Ltd., Seoul (KR)

( * ) Notice: Subject to any disclaimer, the term of this patent is extended or adjusted under 35 U.S.C. 154(b) by 0 days.

(21) Appl. No.: 15/169,372

(22) Filed: May 31, 2016

(65) Prior Publication Data

US 2016/0275316 A1     Sep. 22, 2016

Related U.S. Application Data

(63) Continuation of application No. PCT/KR2014/010067, filed on Oct. 24, 2014.

(30) Foreign Application Priority Data

Nov. 29, 2013    (KR) ........................ 10-2013-0147045

(51) Int. Cl.
    *G06K 7/06*        (2006.01)
    *G06K 7/00*        (2006.01)

(52) U.S. Cl.
    CPC ......... *G06K 7/0004* (2013.01); *G06K 7/0078* (2013.01)

(58) Field of Classification Search
    CPC ...... G07F 19/20; G07F 19/201; G07F 19/205; G07F 19/00; G06Q 20/1085; G06K 19/07769; G06K 19/0723; G06K 19/07749

(Continued)

(56) References Cited

U.S. PATENT DOCUMENTS 5,929,414 A  *  7/1999   Saitoh .................. G06K 7/0004
                                                                              235/380
6,839,772 B1 *   1/2005   Kowalski ............. G06K 7/0004
                                                                               710/14
2011/0084131 A1    4/2011   McKelvey

FOREIGN PATENT DOCUMENTS

EP          0 429 976 A2     6/1991
EP          0 712 087 A2     5/1996

(Continued)

OTHER PUBLICATIONS

Examination Report dated May 8, 2017 in corresponding Japanese Patent Application No. JP 2016-535164.

(Continued)

*Primary Examiner* — Jamara Franklin
(74) *Attorney, Agent, or Firm* — Mintz Levin Cohn Ferris Glovsky and Popeo, P.C.; Kongsik Kim; Carolina Säve (57) ABSTRACT

Various embodiments related to a card reader are described. According to an embodiment, the card reader comprises: a card reader body part; a contact card recognition module included in the card reader body part; a circuit board having a contactless card recognition module included in the card reader body part; a card insertion hole which is formed in the card reader body part and allows a contact card and a contactless card to be inserted; and a rotation guide part rotatably provided within the card insertion hole, wherein the rotation guide part may recognize the contact card in the contact card recognition module by passing the contact card through the card insertion hole according to a rotation, and may recognize the contactless card in the contactless card recognition module by limiting a movement according to a contact after inserting the contactless card into the card insertion hole. In addition, various other embodiments are possible.

10 Claims, 7 Drawing Sheets

(58) Field of Classification Search
USPC .......................... 235/380, 439, 441, 451, 492
See application file for complete search history.

(56) References Cited

FOREIGN PATENT DOCUMENTS

| JP | 09-161021 | | 6/1997 |
|----|-----------|---|--------|
| JP | 2001-222685 | A | 8/2001 |
| JP | 3360002 | B2 | 12/2002 |
| JP | 2005-196375 | A | 7/2005 |
| JP | 2013-507720 | A | 3/2013 |
| KR | 10-2011-0050002 | A | 5/2011 |
| KR | 10-1143856 | B1 | 5/2012 |
| KR | 20-0468168 | Y1 | 8/2013 |

OTHER PUBLICATIONS

Supplementary European Search Report dated Jun. 26, 2017 in corresponding European Patent Application No. 14866465.9.

* cited by examiner

CARD READER

CROSS REFERENCE TO RELATED APPLICATIONS

This application is a continuation of International Application No. PCT/KR2014/010067 filed on Oct. 24, 2014, which claims priority to Korean Application No. 10-2013-0147045 filed on Nov. 29, 2013, which applications are incorporated herein by reference.

TECHNICAL FIELD

Various embodiments of the present invention relate to a card reader configured such that a user can use both a contact type card and a non-contact type card through a single card insertion opening.

BACKGROUND ART

In general, card readers are connected to relay servers or VAN servers through on/off dedicated lines in order to carry out credit card payments.

Credit cards are mainly classified into a magnetic card and an IC card according to a method of storing information therein. The magnetic card uses a magnetic stripe, and the IC card, called a smart card, has an Integrated Circuit (IC) chip therein.

Herein, the magnetic card is referred to as a contact type card, and the IC card is referred to as a non-contact type card.

A contact type card has a magnetic stripe in which data is stored.

A separate contact type card reader is required to read the data from the magnetic stripe of the contact type card.

Namely, the contact type card reader includes a magnetic head and has a card insertion opening, and when the contact type card passes through the card insertion opening from top to bottom, or from left to right, the magnetic head reads the data stored in the magnetic stripe that is attached to the back side of the contact type card, and the contact type card reader outputs the data on the screen and provides various pieces of information to an inquirer.

Meanwhile, a non-contact type card has an IC chip therein, which stores all information therein. The non-contact type card is widely used because it has a higher storage capacity than an existing magnetic card and exhibits good security.

For this reason, the non-contact type card is diversely used for general banking, a credit card, a transportation card, an ID card, etc. In addition, since the non-contact type card may also perform the function of electronic money, the non-contact type card is used to purchase goods in Internet shopping malls or to purchase charged content, as well as to pay a congestion fee, a parking fee, a highway toll fee, etc.

A non-contact type card reader is required in order to stably use the non-contact type card on the Internet, which can be used for various purposes. The non-contact type card reader includes a card reader main body, a signal processing unit, an RF module, an antenna, and a printed circuit board.

The non-contact type card reader is a device that may transmit data from a card to an external device through a connector.

However, in order to use the existing contact type card or non-contact type card, a contact or non-contact type card reader is separately required, which causes an inconvenience to the user.

In other words, there is a shortcoming in that a user has to have a contact type card reader when using a contact type card and has to have a separate non-contact type card reader when using a non-contact type card.

Recently, in order to overcome the shortcoming, a card reader has been developed to use a contact type card and a non-contact type card together.

However, the conventional card reader that is usable for both a contact type card and a non-contact type card, which has separate card insertion openings for sliding the contact and non-contact type cards, causes an inconvenience to the user because the user has to insert a contact type card into the card insertion opening dedicated to a contact type card in order to use it, and has to insert a non-contact type card into the separate card insertion opening dedicated to a non-contact type card in order to use it.

Accordingly, a card reader in which both a contact type card and a non-contact type card can be used through a single card insertion opening is required.

SUMMARY

Various embodiments of the present invention may provide a card reader that has a single card insertion opening formed in a single card reader main body to identify both a contact type card and a non-contact type card passing through the single card insertion opening so that it is possible to use only the single card reader instead of using existing contact and non-contact type card readers that are separately provided, thereby enhancing the use of the product and reducing the cost required for additionally purchasing a product.

Further, various embodiments of the present invention may provide a card reader in which both a contact type card and a non-contact type card can be used through a single card insertion opening formed in a single card reader main body, thereby further enhancing the use of the product.

According to various embodiments of the present invention, a card reader includes: a card reader main body; a card insertion opening that is formed in the card reader main body and into which a contact type card and a non-contact type card are inserted; and a rotation guide unit provided in the card insertion opening to pass the contact type card through the card insertion opening according to the rotation thereof, or to restrict the movement of the non-contact type card according to the contact with the non-contact type card.

According to various embodiments of the present invention, a card reader includes: a card reader main body; a contact type card identification module provided in the card reader main body; a circuit board provided in the card reader main body, the circuit board having a non-contact type card identification module mounted thereon; a card insertion opening formed in the card reader main body, wherein a contact type card and a non-contact type card are inserted into the card insertion opening; and a rotation guide unit rotatably provided in the card insertion opening, wherein the rotation guide unit passes the contact type card through the card insertion opening according to the rotation thereof such that the contact type card identification module identifies the contact type card; and restricts the movement of the non-contact type card according to the contact therewith after the non-contact type card is inserted into the card insertion opening such that the non-contact type card identification module identifies the non-contact type card.

DETAILED DESCRIPTION

Terms used in various embodiments of the present invention will be described in brief first, and then the various embodiments of the present invention will be described in detail.

With respect to the terms in the various embodiments of the present invention, the general terms which are currently and widely used are selected in consideration of functions of structural elements in the various embodiments of the present invention. However, meanings of the terms may be changed according to an inventor's intention, a judicial precedent, appearance of a new technology, and the like. Further, in a certain case, a term arbitrarily selected by the applicant may be used. In such a case, the meaning of the term will be described in detail at the corresponding part in the description of the present invention. Thus, the terms used in various embodiments of the present invention should be defined based on the meanings of the terms and the overall contents of the embodiments of the present invention instead of simple titles of the terms.

Figure 1:
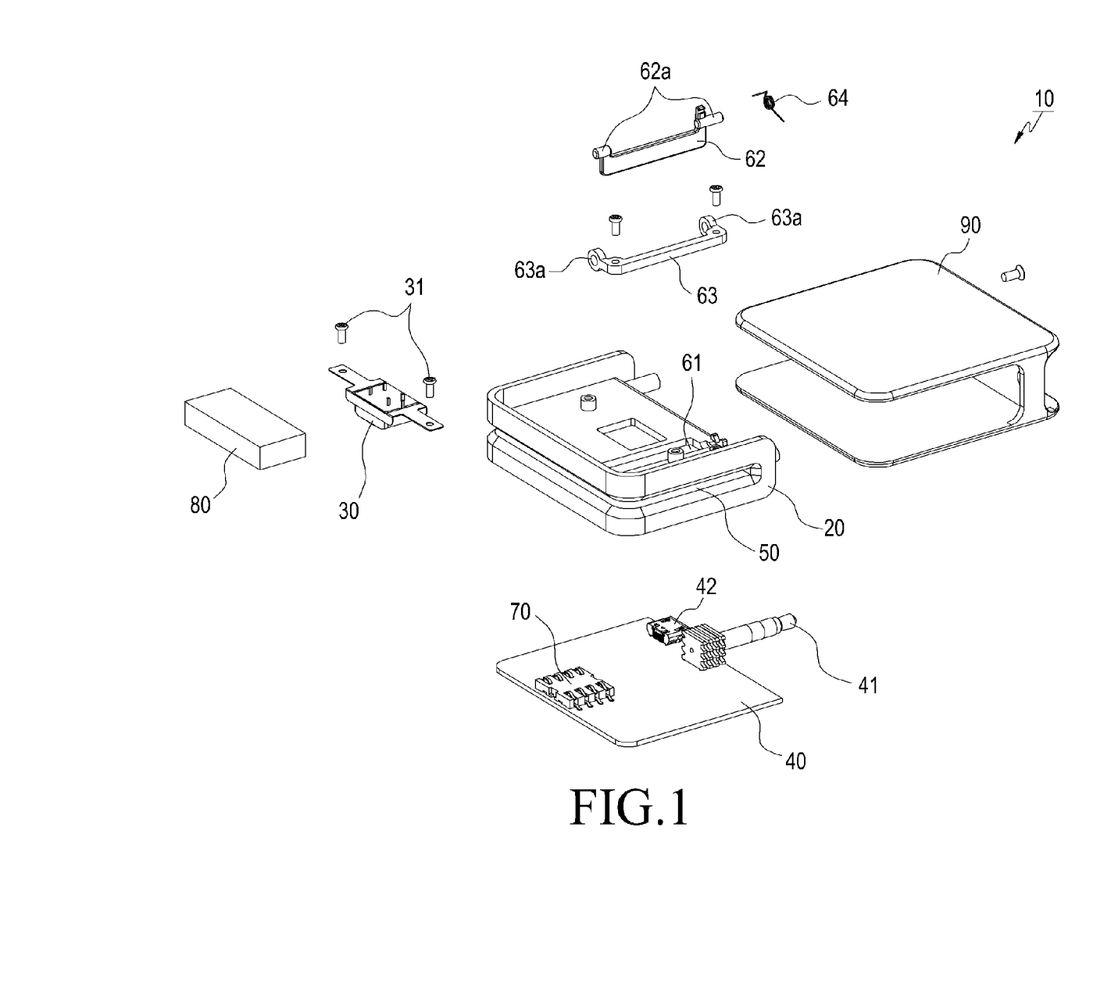
FIG. 1 is an exploded perspective view illustrating the configuration of a card reader according to an embodiment of the present invention.
Figure 2:
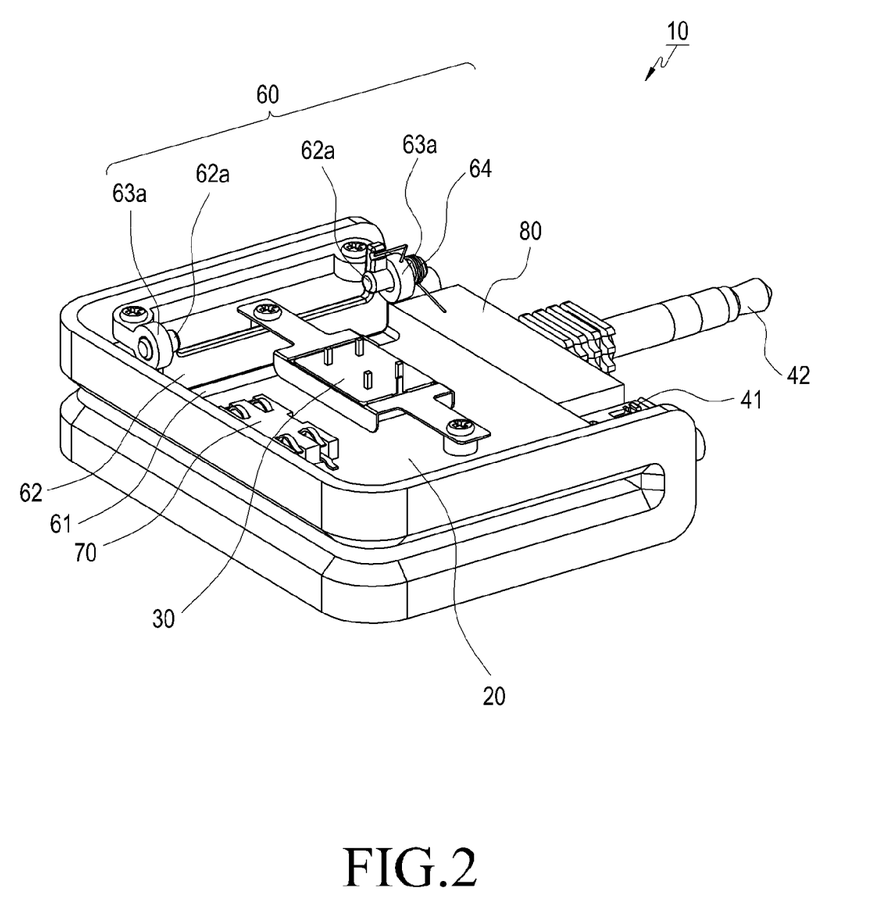
FIG. 2 is a perspective view illustrating the coupled state of the card reader according to the embodiment of the present invention.

FIG. 1 is an exploded perspective view illustrating the configuration of a card reader according to an embodiment of the present invention, and FIG. 2 is a perspective view illustrating the coupled state of the card reader according to the embodiment of the present invention.

The configuration of the card reader 10 will be described with reference to FIGS. 1 and 2. The card reader 10 includes a card reader main body 20, a contact type card identification module 30, a circuit board 40 having a non-contact type card identification module 70 mounted thereon, a card insertion opening 50; and a rotation guide unit 60. The card reader main body 20 is configured such that the contact type card identification module 30, the circuit board 40, the card insertion opening 50, and the rotation guide unit 60, which will be described below, may be provided therein. The contact type card identification module 30 is provided in the card reader main body 20 to identify a contact type card 11, which will be described below. The circuit board 40 has the non-contact type card identification module 70 mounted thereon for identifying a non-contact type card 12, which will be described below, and is provided in the card reader main body 20. The card insertion opening 50, into which both the contact type card 11 and the non-contact type card 12 may be inserted, is formed in the card reader main body 20. The rotation guide unit 60 is rotatably provided in the card insertion opening. The rotation guide unit 60 passes the contact type card 11 through the card insertion opening 50 according to the rotation thereof such that the contact type card identification module 30 may identify a magnetic stripe (not illustrated) provided on the contact type card 11. In addition, the rotation guide unit 60 restricts the movement of the non-contact type card 12 according to the contact therewith after the non-contact type card 12 is inserted into the card insertion opening 50 such that the non-contact type card identification module 70 may identify an IC chip 12a provided in the non-contact type card 12.

Namely, the rotation guide unit 60 passes the contact type card 11 through the card insertion opening 50 while rotating at the same time as making contact with the contact type card 11. In addition, the rotation guide unit 60 restricts the movement of the non-contact type card 12 within the card insertion opening 50 without rotating when it makes contact with the non-contact type card 12 that is inserted into the card insertion opening 50.

As described above, the single card insertion opening 50 is formed in the card reader main body 20 such that both the contact type card 11 and the non-contact type card 12 may be identified and used at the same moment they are inserted into the card insertion opening 50. Accordingly, both the contact type card 11 and the non-contact type card 12 can be used in the single card reader, instead of a contact type card reader and a non-contact type card reader, thereby enhancing the use of the product and reducing the cost required for additionally purchasing a product.

As illustrated in FIG. 1, a cover 90 is provided on the exterior of the card reader main body 20. The cover 90 is coupled to the card reader main body 20 to protect the card reader main body 20. Further, first and second connection terminals 41 and 42 are mounted on the circuit board 40 to electrically connect the card reader main body 20 and external electronic devices (not illustrated). The first connection terminal 41 may include a connection jack, and the second connection terminal 42 may include a USB terminal. In this embodiment, the first and second connection terminals 41 and 42 are exemplified by the connection jack and the USB terminal, respectively, but they are not limited thereto. Namely, any other configurations that may be electrically connected with the external electronic devices (not illustrated) may be applied as various modified examples of the first and second connection terminals 41 and 42.

The electronic device according to the embodiment of the present invention includes all information and communication devices and multimedia devices, such as a Portable Multimedia Player (PMP), an MP3 player, a navigation, a game player, a notebook, a netbook, an advertising panel, a TV, a digital broadcasting receiver, a Personal Digital Assistant, and a smart phone, as well as all kinds of mobile communication terminals which operate according to communication protocols corresponding to various communication systems, and application devices thereof.

Further, as illustrated in FIG. 1, a battery unit 80 is provided in the card reader main body 20 to supply power to the contact type card identification module 30 and the non-contact type card identification module 70. The contact type card identification module 30 is constituted by a magnetic head unit in which a Magnetic Stripe Reader (MSR) is installed to detect data stored in the magnetic stripe (not illustrated) that is provided on the contact type card 11. Namely, at the same moment the contact type card 11 makes contact with the rotation guide unit 60 when passing through the card insertion opening 50, the rotation guide unit 60 rotates to pass the contact type card 11. In other words, the magnetic head unit detects and reads the data stored in the magnetic stripe of the contact type card 11 at the same moment the magnetic stripe (not illustrated) of the contact type card 11 passes through the magnetic head unit.

Here, the contact type card 11 may be a magnetic card having a magnetic stripe provided thereon. The contact type card 11 is exemplified by the magnetic card in this embodiment, but it is not limited thereto. Namely, any other card configurations from which the magnetic head unit may read data at the same moment they make contact with the magnetic head unit may be applied as various modified examples of the contact type card 11.

As illustrated in FIGS. 1 and 2, the non-contact type card identification module 70 is constituted by a reader that reads information stored in the IC chip 12a that is provided within the non-contact type card 12. Namely, if the rotation guide unit 60 restricts the movement of the non-contact type card 12 while making contact with it at the same moment the non-contact type card 12 is inserted into the card insertion opening 50, the reader reads the information stored in the IC chip 12a of the non-contact type card 12.

Here, the non-contact type card 12 may be an IC card having the IC chip 12a therein. Likewise, the non-contact type card 12 is exemplified by the IC card in this embodiment, but it is not limited thereto. Namely, any other card configurations that may not make contact with the reader may be applied as various modified examples of the non-contact type card 12.

More specifically, as illustrated in FIGS. 1 and 2, the rotation guide unit 60 includes a rotation hole 61, a rotary part 62, a rotation hinge part 63, and a resilient member 64. The rotation hole 61 is formed in the card reader main body 20 in order to rotate the rotary part 62 therein and restrict the rotation of the rotary part 62. The rotary part 62 is provided in the rotation hole 61 in order to pass the contact type card 11 through the card insertion opening while rotating at the same time as making contact with the contact type card 11 and to restrict the movement of the non-contact type card 12 within the card insertion opening while making contact with the non-contact type card 12. The rotation hinge part 63 is located adjacent to the rotation hole 61 to rotatably support the rotary part 62. The resilient member 64 is coupled to the rotary part 62 and provides a resilient force in order to rotate the rotary part 62.

The resilient member 64 may be constituted by a wire spring, and other types of springs, such as a coil spring and a plate spring, may be employed for the resilient member 64, as well as the wire spring.

Further, a contact stopper 61a is formed in the rotation hole 61 such that the rotary part 62 makes contact with the contact stopper 61a to restrict the movement of the non-contact type card 12 after the non-contact type card 12 is inserted into the card insertion opening 50. Namely, the contact stopper 61a restricts the rotation of the rotary part 62 while making contact with one end of the rotary part 62. In other words, when the contact type card 11 is inserted into an inlet at one side of the card insertion opening 50, the contact type card 11 makes contact with the rotary part 62 to rotate the rotary part 62 while separating the end of the rotary part 62 from the contact stopper 61a. In this way, the contact type card 11 passes through the card insertion opening 50. After the contact type card 11 passes through the card insertion opening 50, the rotary part 62 rotates by the resilient member 64 and returns to the original position, in which case the end of the rotary part 62 makes contact with the contact stopper 61a so that the rotation of the rotary part 62 is restricted by the contact stopper 61a.

When the non-contact type card 12 is inserted into an inlet at the opposite side of the card insertion opening 50, the non-contact type card 12 makes contact with the rotary part 62 so that the movement of the non-contact type card 12 is restricted by the rotary part 62. Namely, the non-contact type card 12 inserted into the card insertion opening 50 is identified by the non-contact type card identification module 70 that is provided in the card reader main body 20.

Herein, the assembly of the card reader will be described with reference to FIGS. 1 and 2. First, the rotary part 62 is rotatably coupled to the card reader main body 20 in which the card insertion opening 50 is formed as illustrated in FIGS. 1 and 2. In this case, the rotary part 62 is provided so as to be rotatable within the rotation hole 61 that is formed in the card reader main body 20 to receive the rotary part 62 therein.

The rotary part 62 is rotatably coupled to the rotation hinge part 63 that is located adjacent to the rotation hole 61 to support the rotation of the rotary part 62.

The rotation hinge part 63 is screw-coupled to the card reader main body 20. In other words, the rotation hinge part 63 has hinge holes 63a formed on opposite sides thereof, and hinge arms 62a of the rotary part 62 are coupled to the hinge holes 63a. In this case, the resilient member 64 is mounted on one of the hinge arms 62a of the rotary part 62 in order to apply a resilient force to the rotary part. Further, the contact type card identification module 30 and the circuit board 40 on which the non-contact type card identification module 70 is mounted are provided in the card reader main body 20. In this case, the contact type card identification module 30 and the non-contact type card identification module 70 are arranged side by side in the card reader main body 20. The battery unit 80 is provided in the card reader main body 20 to supply power to the non-contact type card identification module 70. The cover 90 is mounted on the exterior of the card reader main body 20.

Figure 3:
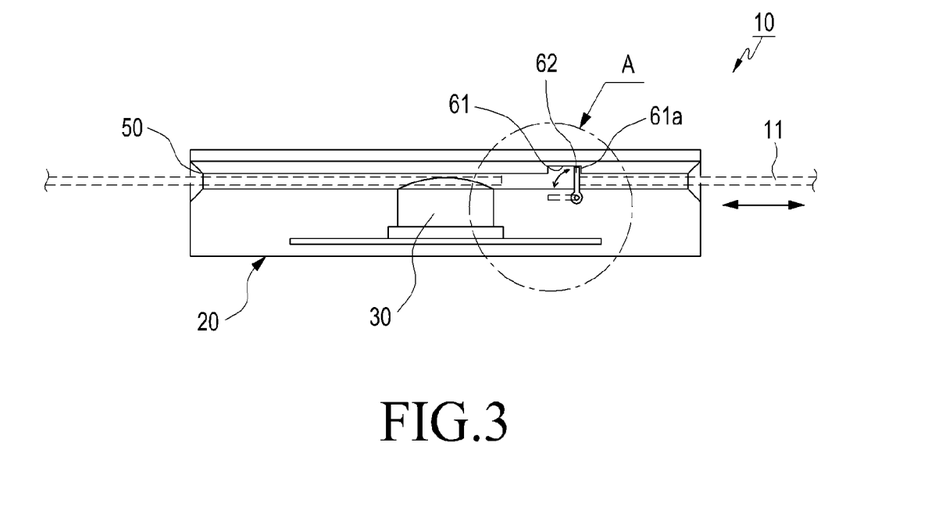
FIG. 3 is a plan view illustrating a state in which a contact type card is used in the card reader according to the embodiment of the present invention.
Figure 4:
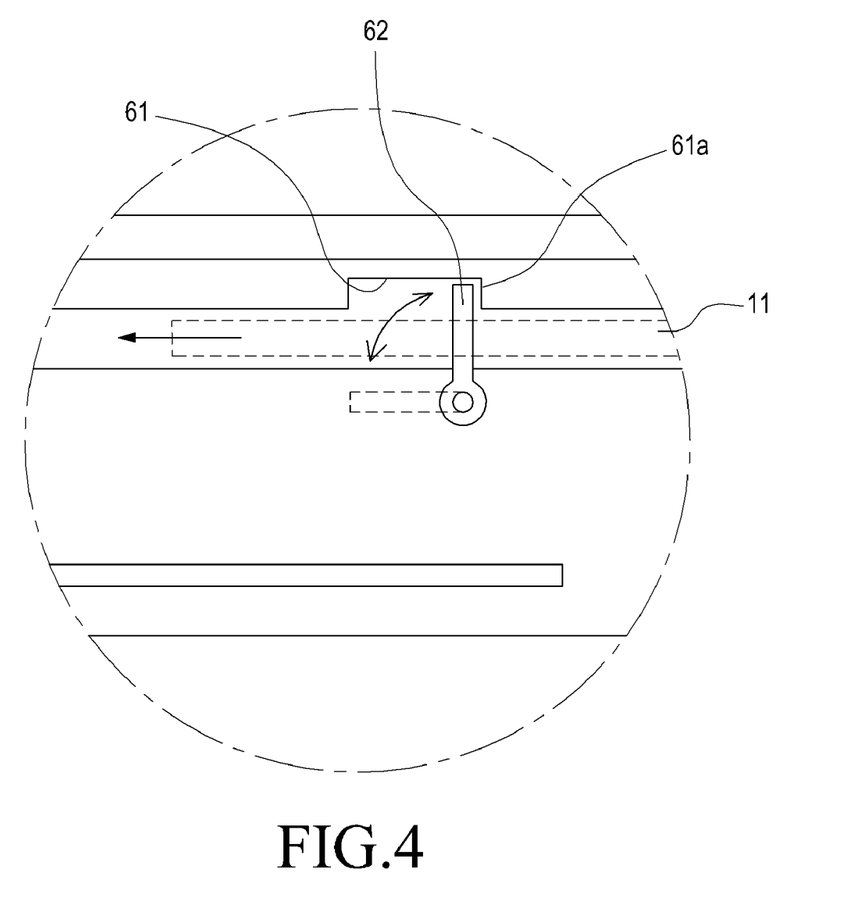
FIG. 4 is an enlarged plan view of portion A of FIG. 3.
Figure 5:
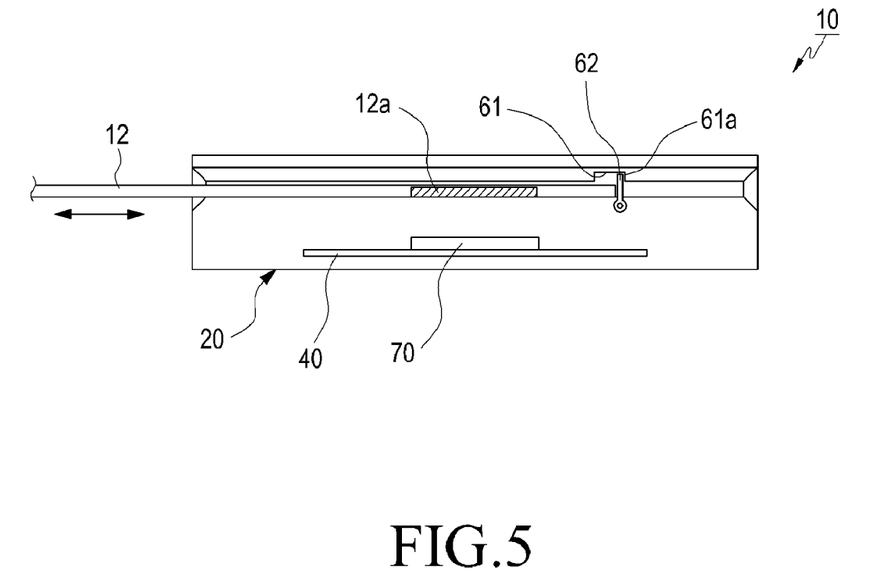
FIG. 5 is a plan view illustrating a state in which a non-contact type card is used in the card reader according to the embodiment of the present invention.
Figure 6:
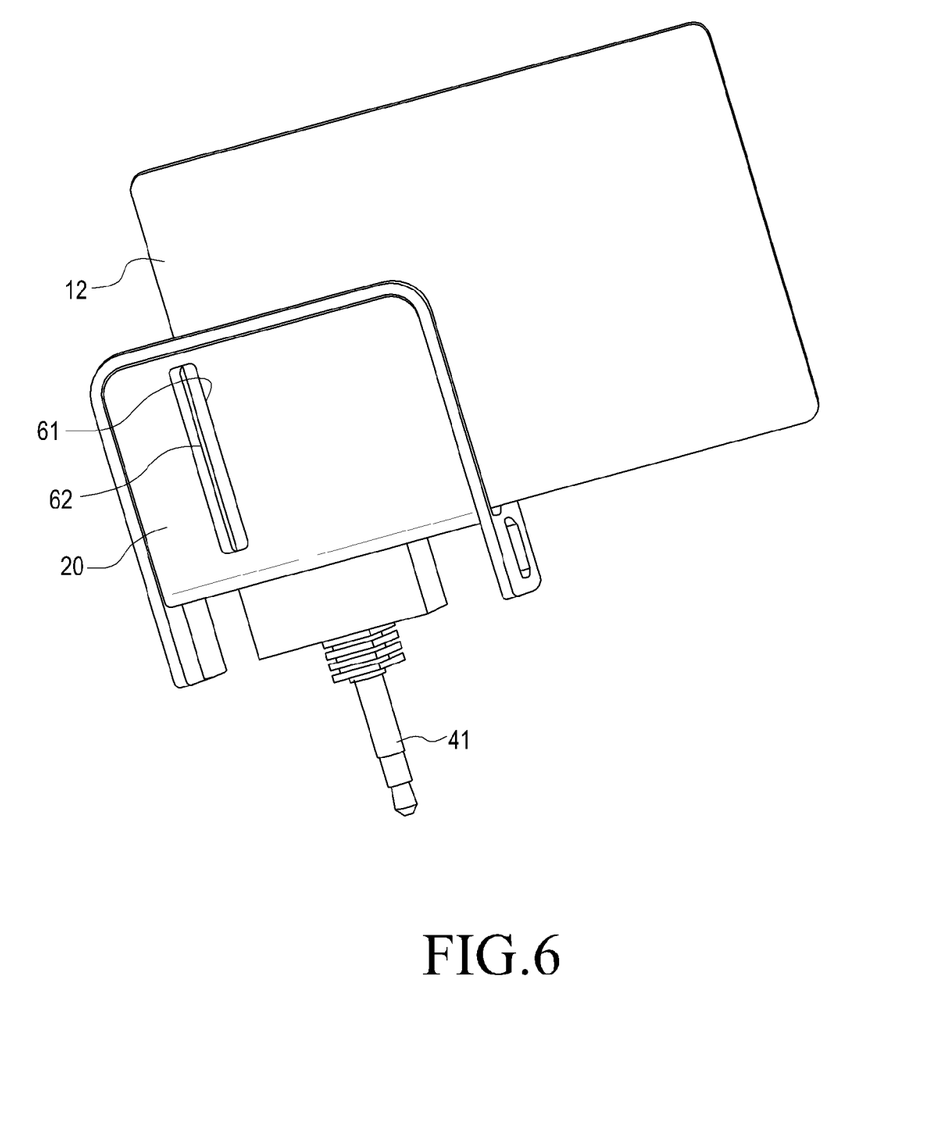
FIG. 6 is a side view illustrating the state in which the non-contact type card is used in the card reader according to the embodiment of the present invention.
Figure 7:
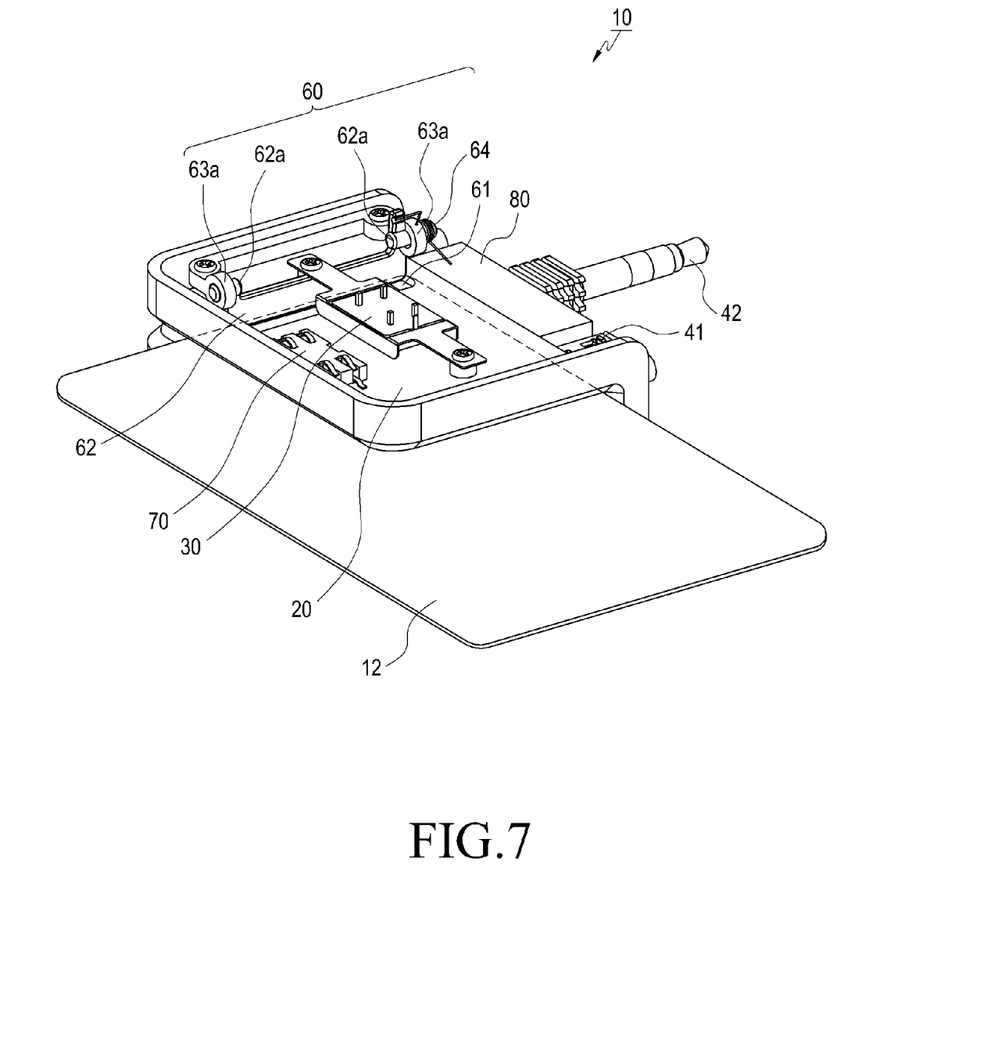
FIG. 7 is a perspective view illustrating a state in which the non-contact type card and a rotation guide unit make contact with each other in the card reader according to the embodiment of the present invention.

Hereinafter, the operation of the card reader will be described in more detail. FIG. 3 is a plan view illustrating a state in which the contact type card 11 is inserted into the card insertion opening 50 of the card reader main body 20 according to the present invention. FIG. 4 is an enlarged plan view of portion A of FIG. 3. FIG. 5 is a plan view illustrating a state in which the non-contact type card 12 is inserted into the card insertion opening 50 of the card reader main body 20 according to the present invention. FIG. 6 is a side view illustrating the state in which the card reader, according to the present invention, is used for the non-contact type card 12. FIG. 7 is a perspective view illustrating a state in which the non-contact type card 12 and the rotation guide unit 60 make contact with each other in the card reader according to the embodiment of the present invention.

As illustrated in FIGS. 3 and 4, the contact type card 11 is inserted into the card insertion opening 50 through one side thereof and passes through the card insertion opening 50. Namely, when the contact type card 11 starts from one side of the card insertion opening 50 and passes through the card insertion opening 50 from the left to the right, the contact type card 11 makes contact with the rotary part 62 of the rotation guide unit 60 at the same moment it is inserted into the card insertion opening 50, and the rotary part 62 rotates at the same moment the contact-type card 11 is brought into contact with the rotary part 62, and passes the contact type card 11 through the card insertion opening 50. When the contact type card 11 passes through the rotary part 62, the contact type card identification module 30 provided in the card reader main body 20 reads data stored in the magnetic stripe (not illustrated) that is provided on the contact type card 11.

The contact type card identification module 30 imparts the data, which is read from the magnetic stripe, to the external electronic devices (not illustrated) through the first and second connection terminals 41 and 42.

As illustrated in FIG. 3, after the contact type card 11 passes through the card insertion opening 50, the rotary part 62 rotates again by the resilient member 64 and returns to the original position. At this time, the end of the rotary part 62 makes contact with the contact stopper 61a formed in the rotation hole 61 so that the rotation of the rotary part 62 is restricted.

In a case where a user uses the non-contact type card 12, the non-contact type card 12 is inserted into the card insertion opening 50 through the opposite side thereof. Namely, when the non-contact type card 12 is inserted into the card insertion opening 50 from the right to the left, the non-contact type card 12 makes contact with the rotary part 62 and stops.

In other words, as illustrated in FIG. 5, when the non-contact type card 12 starts from the opposite side of the card insertion opening 50 and is inserted thereinto from the right to the left, the non-contact type card 12 does not completely pass through the card insertion opening 50, and makes contact with the rotary part 62 in a position that exceeds half of the card insertion opening 50 so that the movement of the non-contact type card 12 is restricted. The rotary part 62 does not rotate because the rotary part 62 makes contact with the contact stopper 61a.

In this case, as illustrated in FIG. 7, the non-contact type card 12 corresponds to the non-contact type card identification module 70 provided in the card reader main body 20 and is close to the non-contact type card identification module 70. The non-contact type card identification module 70 reads and identifies the information of the IC chip 12a (not illustrated) that is provided in the non-contact type card 12.

Further, an RF module (not illustrated) and an antenna (not illustrated) that are provided in the non-contact type card identification module 70 receive the signal of the non-contact type card 12, and the signal is imparted to a signal processing unit (not illustrated) of the non-contact type card identification module 70.

The signal processing unit (not illustrated) transmits the signal to the external electronic devices (not illustrated) through the first and second connection terminals 41 and 42.

In a case where a user uses an existing contact type card (not illustrated) or non-contact type card (not illustrated), the user has to have separate card readers (not illustrated) so that it costs a lot to purchase the products. Further, an existing card reader that is usable for both a contact type card and a non-contact type card, which has separate card insertion openings for them, causes an inconvenience to a user because the user has to insert a contact type card into the card insertion opening dedicated to a contact type card in order to use it, and has to insert a non-contact type card into the separate card insertion opening dedicated to a non-contact type card in order to use it.

Accordingly, in order to overcome the shortcoming, the card reader 10 (illustrated in FIG. 1) of the present invention is configured such that both the contact type card 11 (illustrated in FIG. 3) and the non-contact type card 12 (illustrated in FIG. 5) are used through the single card insertion opening 50 (illustrated in FIG. 1). Therefore, it is possible to enhance user convenience and to reduce the cost required to purchase a product because there is no need to additionally purchase an existing card reader according to use.

According to the various embodiments of the present invention, the single card insertion opening is formed in the single card reader main body to identify both a contact type card and a non-contact type card passing through the card insertion opening so that it is possible to use only the single card reader instead of existing contact and non-contact type card readers that are separately provided, thereby enhancing the use of the product and reducing the cost required for additionally purchasing a product.

In addition, both a contact type card and a non-contact type card can be used through the single card insertion opening formed in the single card reader main body so that it is possible to further enhance the use of the product.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A card reader comprising:
   a card reader main body;
   a card insertion opening that is formed in the card reader main body and wherein a contact type card is inserted into one side of the card insertion opening and a non-contact type card is inserted into an opposite side of the one side of the card insertion opening; and
   a rotation guide unit provided in the card insertion opening to pass the contact type card through the card insertion opening according to the rotation thereof, or to restrict the movement of the non-contact type card according to the contact with the non-contact type card.

2. The card reader as claimed in claim 1, wherein a contact type card identification module and a non-contact type card identification module are provided in the card insertion opening to identify the contact type card and the non-contact type card, respectively.

3. A card reader comprising:
   a card reader main body;
   a contact type card identification module provided in the card reader main body;
   a circuit board provided in the card reader main body, the circuit board having a non-contact type card identification module mounted thereon;
   a card insertion opening formed in the card reader main body, wherein a contact type card is inserted into one side of the card insertion opening and a non-contact type card is inserted into an opposite side of the one side of the card insertion opening; and
   a rotation guide unit rotatably provided in the card insertion opening,
   wherein the rotation guide unit passes the contact type card through the card insertion opening according to the rotation thereof such that the contact type card identification module identifies the contact type card; and restricts the movement of the non-contact type card according to the contact therewith after the non-contact type card is inserted into the card insertion opening such that the non-contact type card identification module identifies the non-contact type card.

4. The card reader as claimed in claim 3, further comprising:
   first and second connection terminals provided on the circuit board to electrically connect the card reader main body and external electronic devices, wherein the first connection terminal is configured with a connection jack, and the second connection terminal is configured with a USB terminal.

5. The card reader as claimed in claim 3, further comprising:
   a battery unit provided in the card reader main body to supply power to the contact type card identification module and the non-contact type card identification module.

6. The card reader as claimed in claim 3, wherein the contact type card is a magnetic card having a magnetic stripe mounted thereon, and the non-contact type card is an IC card having an IC chip therein.

7. The card reader as claimed in claim 3, wherein the rotation guide unit comprises:
   a rotation hole formed in the card insertion opening;
   a rotary part provided in the rotation hole, wherein the rotary part guides the insertion of the contact type card into the card insertion opening by rotating while making contact with the contact type card, and restricts the movement of the non-contact type card in the card insertion opening by making contact with the non-contact type card;
   a rotation hinge part provided adjacent to the rotation hole to rotatably support the rotary part; and
   a resilient member coupled to the rotary part to provide a resilient force in order to rotate the rotary part.

8. The card reader as claimed in claim 7, wherein the rotation guide unit further comprises a contact stopper that is provided in the rotation hole to restrict the rotation of the rotary part by making contact with the rotary part.

9. The card reader as claimed in claim 3, further comprising:
   a cover provided on the exterior of the card reader main body, wherein the cover is coupled to the card reader main body to protect the same.

10. The card reader as claimed in claim 7, wherein when the contact type card is inserted into, and passes through, the card insertion opening, the rotary part guides the contact type card by rotating while making contact with the contact type card such that the contact type card passes through one side of the card insertion opening, and the contact type card identification module identifies a magnetic stripe provided on the contact type card; and
   when the non-contact type card is inserted into the opposite side of the one side of the card insertion opening, the rotary part restricts the movement of the non-contact type card by making contact with the non-contact type card, and the non-contact type card identification module identifies an IC chip provided in the non-contact type card.

* * * * *